Patented June 12, 1934

1,962,887

UNITED STATES PATENT OFFICE 1,962,887

METHOD OF CONTROLLING CRYSTAL SIZE

Kenneth D. Ashley, Elizabeth, and Waldemar C. Hansen, Westfield, N. J., assignors to American Cyanamid Company, New York, N. Y., a corporation of Maine No Drawing. Application February 7, 1931, Serial No. 514,318

9 Claims. (Cl. 23—122)

This invention relates to methods of precipitating calcium sulphate as gypsum, whereby the shape and size of the gypsum crystals are controlled.

Gypsum is a by-product in a number of industries. For example, it is formed as a by-product when phosphate rock is acidulated with sulphuric acid in the manufacture of phosphoric acid. It is necessary in the manufacture of phosphoric acid to remove the gypsum from the acid. This may be done in a number of ways, most common of which is by filtration or settling. The ease with which this gypsum can be removed and washed free of phosphoric acid, depends almost entirely upon the physical condition of the gypsum, that is, the size and shape of the gypsum crystals. Various methods of separating the gypsum from the acid are used, the type of gypsum crystal most satisfactory for one method not being always applicable or satisfactory for another. Therefore, the ability to control the physical condition of gypsum is of great economic interest and importance to those industries which produce this material as a product or by-product, where the gypsum has to be separated from the menstruum either by settling or by filtration.

By extensive experimentation, it has been developed that it is possible to get gypsum to crystallize either as long, narrow plates or as short, broad plates. While it is not apparently possible to eliminate entirely the crystallization of one type in the presence of the other, yet conditions have been determined whereby it is possible to get a large preponderance of either type as desired. The long, narrow crystals are usually several times longer than they are broad, while the short plates are ordinarily about as broad as they are long.

It has been discovered that a hydrated salt such as gypsum will lose water of crystallization to another system if the vapor pressure of the hydrated salt system is greater than the vapor pressure of the other system. For example, it has been found that gypsum in water will lose water of hydration and form a hemihydrate, to wit, $CaSO_4 \cdot \frac{1}{2}H_2O$, if the water gypsum mixture is heated in a suitable container to 107° C. That is, at 107°C., the vapor pressure of the system water vapor is less than the vapor pressure of the system gypsum-hemihydrate water vapor.

It has also been discovered that solutes such as salts and acids when dissolved in water give solutions which have vapor pressures lower than that of pure water where these pressures are measured at the same temperature. The vapor pressure of water varies as the temperature varies, and the vapor pressure of a solution varies both as the temperature and as the concentration of the solute varies. The vapor pressures of most liquids and solutions at various temperatures have been determined and published in many technical books and journals, so that no further discussion or presentation of vapor pressure data is necessary here.

By the use of this knowledge of the vapor pressures of various systems, it has been discovered that it is possible to dehydrate gypsum to hemihydrate in the presence of water or solutions. For example, a 25% sulphuric acid solution in water above 80° C. has a vapor pressure less than that of the system gypsum-hemihydrate-water vapor at the same temperature, and hence gypsum can be dehydrated in such a solution above 80° C. The thus produced hemihydrate can be re-hydrated back to gypsum in the same solution by lowering the temperature thereof below 80° C. It is, therefore, possible to prepare calcium sulphate hemihydrate in the presence of solutions and to subsequently re-hydrate the material to gypsum by changing either the concentration or the temperature of the solution, or both. This invention, however, goes beyond this discovery and has for its principal object the control of the size and shape of the gypsum crystals obtained by controlling the conditions which govern the formation of the two types of gypsum crystals.

To this end, the invention contemplates the precipitation of calcium sulphate as a hemihydrate in a menstruum, and then controlling either the temperature or the concentration of such menstruum or a hydrating menstruum, so as to cause the hemihydrate to hydrate to gypsum. The invention contemplates the adjustment of either the temperature or concentration of the menstruum soon after the hemihydrate is formed, for if the hemihydrate is kept in the menstruum for two or more hours, the rate of re-hydration is slowed down markedly.

The invention further contemplates the formation of built-up or large crystals of gypsum by the addition of batch after batch of hemihydrate to a hydration vessel, the crystals of gypsum of additional batches building up upon the hydrated crystals from the previous batch. This procedure produces very large crystals, which settle rapidly and are easy to filter and wash, a most desirable characteristic. In other words, by controlling the temperatures and concentrations in the hydration tank, the type of gypsum crystal obtained is likewise controlled and they may be produced either as long, narrow crystals or as short, broad crystals.

The description here is specifically directed to the process of producing gypsum in phosphoric acid solutions, but those skilled in the art may easily obtain from published data, the temperature or concentrations needed to carry out the invention in other processes, and hence the invention is not to be limited alone to the application of these methods in the manufacture of phosphoric acid. Likewise, while the description is specific to certain concentrations and temperatures, yet other concentrations and temperatures may be used, it being simply a matter of calculation based upon the present invention or discovery.

One common method of manufacturing phosphoric acid is to add simultaneously ground phosphate rock and concentrated sulphuric acid to a digestion tank containing weak phosphoric acid. The temperature and concentration are usually controlled so that the calcium sulphate as formed in the reaction crystallizes at once as gypsum. This method does not allow of a great deal of control of the size and type of gypsum crystals, and hence difficulties are encountered in the separation of such crystals either by settling or filtration.

We have developed procedures to control the temperature and concentration in the above process in such a manner as to cause the calcium sulphate to crystallize and precipitate first as hemihydrate. The conditions of temperature and concentration are then changed to allow the hemihydrate to hydrate and crystallize as gypsum. This is the first important step in the present process.

It has been discovered by us that when the conditions are controlled so as to form hemihydrate from the reaction between phosphate rock with sulphuric acid, two types of hemihydrate are formed. The hemihydrate formed at first is a very fine grain, either crystalline or amorphous and hydrates into gypsum very readily where the conditions are changed to permit this re-hydration to take place. If this first formed hemihydrate is kept in the mixture for some time, it changes to larger crystals, and these crystals hydrate fairly slowly.

It has also been discovered by us that when one batch of hemihydrate is allowed to hydrate and then another batch of hemihydrate is added to the first hydrated batch, the second batch of crystals in hydrating will grow upon the first, thus causing the first crystals to become larger. This procedure of adding a fresh batch of hemihydrate to the previously hydrated batch can be continued until the crystals of gypsum are of the desired size, and as a cyclic process.

We have also found that the speed of hydration has a distinct bearing upon the difference in size of the gypsum crystals formed. The speed of crystallization of the hemihydrate to gypsum is faster, the more the temperature and concentration of the solution departs from the temperature and concentration at which the mixture would remain as hemihydrate indefinitely. Thus, if the hemihydrate is formed in the mixture at 80° C., the hydration is slower if permitted to take place at 70° C. than it is if permitted to take place at 50° C.

We have also discovered that the shape of the crystal is controlled to a large extent by the concentration of the phosphoric acid in the mixture. If a batch of hemihydrate is prepared and transferred to water, the gypsum crystals are for the most part long, slender plates. If the hemihydrate is allowed to hydrate by cooling the mixture, the crystals tend to be shorter and broader.

In view of the above, it will be seen that by a control of the rate of re-hydration of hemihydrate, and by the control of the concentration of the medium in which it re-hydrates, and by adding the fresh batch of hemihydrate to a batch previously hydrated, we are able to control the shape and size of the gypsum crystals which are formed.

Example 1

400 parts of tri-calcium phosphate
600 parts of water
400 parts of 96% sulphuric acid
Temperature—95° C.±5°
Mixing time—15 minutes The thus produced hemihydrate was added to 2,000 parts of water maintained at 75° C.±5° for hydration. After this batch was hydrated, another batch of hemihydrate was prepared as above and added to the first hydrated batch. When upon microscopic examination, it was found that this material had hydrated, another batch of hemihydrate was added, and when this was hydrated, still another batch of hemihydrate was added. Microscopic examination of the material showed that the majority of the crystals formed measured approximately 200 by 50 microns.

Example 2

This example was prepared the same as Example 1, except that hydrated crystals resulting from the above example were used to seed the mixture and the hemihydrate was allowed to run into the hydration vessel slowly in a continuous stream, whereas in Example 1 each batch of the hemihydrate was dumped in at once. In the present case, the majority of gypsum crystals measured approximately 400 by 70 microns.

Example 3

This run was conducted substantially the same as Example 2, except that seed crystals from Example 2 were used and the rate of addition of the hemihydrate to the hydration vessel was appreciably slower than that of Example 2. The gypsum crystals resulting from this run measured substantially 700 by 90 microns.

The following series of experiments demonstrate the manner in which size of the gypsum crystals may be controlled.

Example A 450 parts water
100 parts 96% sulphuric acid
100 parts tri-calcium phosphate
Mixing temperature 95° C.±5°

The hemihydrate thus produced was added to 200 parts water and permitted to hydrate at 70° C.±5°. The gypsum crystals thus produced measured approximately 50 by 10 microns.

Example B

This run was conducted the same as Example A, except that the 450 parts of water used were substituted by 450 parts of 7° Bé. phosphoric acid. The gypsum crystals thus produced measured approximately 75 by 20 microns.

Example C

This run was conducted substantially the same as run B, except that a 14° Bé. phosphoric acid was used. The gypsum crystals produced as a result of this procedure measured substantially 35 by 20 microns.

*Example D*

This run was conducted substantially the same as run B, except that a 18° Bé. phosphoric acid was used. The gypsum crystals produced measured approximately 35 by 25 microns.

*Example E*

This run was conducted in the same manner as Example B, except that a 23° Bé. phosphoric acid was used and the mixture was seeded with hydrated crystals from D. The resultant gypsum crystals measured approximately 60 by 50 microns.

We have found that the hydration becomes quite slow at 70° C. when the solutions become as concentrated as in Examples D and E. However, the hydration proceeds fairly rapidly if the mixture is seeded. The gypsum thus produced by hydration deposits largely on the seed crystals, causing them to become appreciably larger.

The above examples serve to show that the long, slender gypsum crystals are produced where a hemihydrate is allowed to hydrate in dilute phosphoric acid solution, and that as the concentration of the acids in the hydration vessel increases, the gypsum crystals gradually become broader and shorter.

From the above, it will be clear that we have produced a workable method whereby the physical characteristics of the hydrated gypsum crystals may be controlled and crystals may be obtained which, due to these physical characteristics, insure maximum ease of separation, whether by settling or filtration.

We claim:

1. A method of producing gypsum which consists of precipitating calcium sulphate hemihydrate in a liquid menstruum, transferring the hemihydrate to a hydrating menstruum, hydrating the hemihydrate while contained therein, and while hydration is taking place adding thereto more hemihydrate, whereby the additional hemihydrate hydrates and builds up upon the first formed crystals of hydrate.

2. A method of producing gypsum which consists of precipitating calcium sulphate hemihydrate in a liquid menstruum, and then diluting the menstruum without agitation, whereby hydration of the hemihydrate will take place.

3. A method of producing gypsum which consists of precipitating calcium sulphate hemihydrate in a liquid menstruum, and then reducing the menstruum temperature without agitation, whereby hydration of the hemihydrate will take place.

4. A method of producing gypsum which consists in precipitating calcium sulphate hemihydrate in a liquid menstruum, and then reducing the menstruum temperature not more than two hours after hemihydrate precipitation without agitation, whereby hydration of the hemihydrate will take place.

5. A method of producing gypsum which consists in precipitating calcium sulphate hemihydrate in a liquid menstruum containing dilute phosphoric acid, hydrating the hemihydrate while contained in the menstruum, and while hydration is taking place adding thereto more hemihydrate, whereby the additional hemihydrate hydrates and builds upon the first formed crystals of hydrate.

6. A method of producing gypsum which consists in precipitating calcium sulphate hemihydrate in a liquid menstruum containing concentrated phosphoric acid, hydrating the hemihydrate while contained in the menstruum, and while hydration is taking place adding thereto more hemihydrate, whereby the additional hemihydrate hydrates and builds upon the first formed crystals of hydrate.

7. A method of producing gypsum crystals of desired size which consists in precipitating calcium sulphate hemihydrate in a liquid menstruum, and changing the concentration thereof without agitation so as to cause hydration of the hemihydrate to crystals of gypsum of the desired size.

8. A method of producing gypsum crystals of desired size which consists in precipitating calcium sulphate hemihydrate in a liquid menstruum, and changing the temperature thereof without agitation so as to cause hydration of the hemihydrate to crystals of gypsum of the desired size.

9. A method of producing gypsum crystals of desired size which consists in precipitating calcium sulphate hemihydrate in a liquid menstruum, and changing the concentration and temperature thereof without agitation so as to cause hydration of the hemihydrate to crystals of gypsum of the desired size.

KENNETH D. ASHLEY.
WALDEMAR C. HANSEN.